United States Patent
Fitzgibbon

(10) Patent No.: US 9,396,648 B2
(45) Date of Patent: Jul. 19, 2016

(54) APPARATUS AND METHOD PERTAINING TO THE USE OF WIRELESS SIGNALS TO CONTROL AN APPLIANCE

(75) Inventor: James Joseph Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1098 days.

(21) Appl. No.: 13/291,700

(22) Filed: Nov. 8, 2011

(65) Prior Publication Data

US 2013/0114188 A1 May 9, 2013

(51) Int. Cl.
*H04B 7/00* (2006.01)
*G08C 17/02* (2006.01)
*H04W 8/00* (2009.01)

(52) U.S. Cl.
CPC ............... *G08C 17/02* (2013.01); *H04W 8/005* (2013.01)

(58) Field of Classification Search
CPC ..... H04W 8/005; H04W 88/06; H04W 24/02; H04W 88/02; H04W 8/265; G06F 1/1613; H04M 2207/18; H04M 2203/1091; H04M 1/006; H04M 1/72522; H04M 3/42178
USPC ........... 455/41.1, 41.2, 41.3, 419; 361/679.01
See application file for complete search history.

(56) References Cited

U.S. PATENT DOCUMENTS

| | | | |
|---|---|---|---|
| 6,791,467 B1* | 9/2004 | Ben-Ze'ev | G08C 19/28 340/12.25 |
| 7,865,568 B1* | 1/2011 | Redi | G08C 17/02 709/217 |
| 7,880,394 B2 | 2/2011 | Sibalich et al. | |
| 2004/0085941 A1* | 5/2004 | Li | G08C 17/02 370/338 |
| 2007/0159349 A1* | 7/2007 | Chang | G08C 17/02 340/4.3 |
| 2007/0222635 A1* | 9/2007 | Clout | G08C 17/02 340/9.1 |
| 2007/0293208 A1* | 12/2007 | Loh | H04L 12/282 455/419 |
| 2009/0136231 A1* | 5/2009 | Lai | G08C 17/02 398/112 |
| 2009/0202250 A1* | 8/2009 | Dizechi | G08C 23/04 398/107 |
| 2009/0240308 A1* | 9/2009 | Feher | H04W 64/00 607/60 |
| 2009/0322550 A1* | 12/2009 | Yu | G08C 17/00 340/12.22 |
| 2010/0124920 A1* | 5/2010 | Feher | H04W 64/00 455/426.1 |
| 2012/0242526 A1* | 9/2012 | Perez | G08C 17/02 341/176 |
| 2012/0295662 A1* | 11/2012 | Haubrich | H04M 1/72533 455/556.1 |
| 2013/0114188 A1* | 5/2013 | Fitzgibbon | H04W 8/005 361/679.01 |

OTHER PUBLICATIONS

TV-B-Gone; http://www.tvbgone.com/cfe_tvbg_main.php; This reference was known as early as Sep. 23, 2008.

(Continued)

*Primary Examiner* — Md Talukder
(74) *Attorney, Agent, or Firm* — Fitch Even Tabin & Flannery LLP

(57) ABSTRACT

An appliance wirelessly receives any of a plurality of different signals that comprise control instructions from a transmitter for a second appliance other than the appliance and of a different class of appliance. The appliance then provides, in the absence of learning, any of a plurality of different control instructions to be used by the appliance as a function of that received signal. By one approach those wirelessly-received control instructions relate to controllable functions for the second appliance. Pursuant to these teachings, the receiving appliance effectively converts a received control instruction that relates to one kind of functionality for a given kind of appliance into a control instruction that relates to a different kind of functionality and that is usable by a different kind of appliance.

45 Claims, 3 Drawing Sheets

(56) References Cited

OTHER PUBLICATIONS

Consumer IR; From Wikipedia, the free encyclopedia; This Wikipedia content was printed on Nov. 13, 2011. www.wikipedia.com maintains a history of past versions and their corresponding dates with each such article.
Koolatron Remote Dimmer Switch; http://www.koolatron.com/manuals/IR%20Remote%20Switch%20Instructions.pdf; This reference was known as early as Sep. 23, 2008.
RC-5; From Wikipedia, the free encyclopedia; This Wikipedia content was printed on Nov. 13, 2011. www.wikipedia.com maintains a history of past versions and their corresponding dates with each such article.
Remote Control; From Wikipedia, the free encyclopedia; This Wikipedia content was printed on Nov. 13, 2011. www.wikipedia.com maintains a history of past versions and their corresponding dates with each such article.
TV-B-Gone; From Wikipedia, the free encyclopedia; This Wikipedia content was printed on Nov. 13, 2011. www.wikipedia.com maintains a history of past versions and their corresponding dates with each such article.
What is LIRC? Linux Infrared Remote Control; http://www.lirc.org/; This reference was known as early as Sep. 23, 2008.
Koolatron; http://www.koolatrononline.stores.yahoo.net/ir-remote-switch.html; This reference was known as early as Sep. 23, 2008.

* cited by examiner

APPARATUS AND METHOD PERTAINING TO THE USE OF WIRELESS SIGNALS TO CONTROL AN APPLIANCE

TECHNICAL FIELD

This invention relates generally to appliances and more particularly to the use of wireless signals to control appliances.

BACKGROUND

Numerous appliances are known in the art. Many appliances operate in conjunction with a hand-held transmitter (a so-called remote control). In such a case the hand-held transmitter permits a user to issue commands to the appliance from some distance (such as a few feet or a few yards). Various carrier and modulation approaches serve in these regards including both radio-frequency carriers and infrared-light carriers.

A great myriad of signaling protocols and schemes also exist in these regards. Some are unique unto themselves in nearly every regard. Others are based, in whole or in part, upon a more general scheme such as the Philips RC-5 and RC-6 consumer infrared remote control communication protocol or the so-called NEC protocol used by many Japanese manufacturers.

That said, most such hand-held transmitters are configured to operate with either a specific corresponding appliance or a specific class of appliance such as televisions, light fixtures, and so forth. In some cases the hand-held transmitter is configured to operate compatibly with two or more specific appliances. For example, a single hand-held transmitter may permit the user to control a television receiver as well as a DVD player.

Such remote controls offer numerous benefits and advantages. Remote controls are not, however, a panacea. For example, including a remote control with a corresponding appliance adds cost and increased packaging requirements. Remote controls are also often relatively small and have a way of becoming misplaced and hence unavailable at a time of need.

DESCRIPTION OF THE DRAWINGS

The above needs are at least partially met through provision of the apparatus and method pertaining to the use of wireless signals to control an appliance described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an appliance wirelessly receives any of a plurality of different signals that comprise control instructions from a transmitter for a second appliance other than the appliance and of a different class of appliance. The appliance then provides, in the absence of learning, any of a plurality of different control instructions to be used by the appliance as a function of that received signal.

By one approach those wirelessly-received control instructions relate to controllable functions for the second appliance. Pursuant to these teachings, the receiving appliance effectively converts a received control instruction that relates to one kind of functionality for a given kind of appliance into a control instruction that relates to a different kind of functionality and that is usable by a different kind of appliance.

So configured, any of a variety of remote controls can be compatibly used with an appliance for which the remote control is not designed to be used. By avoiding a learning mode of operation, this result avails in a manner that is essentially transparent to the user. Accordingly, the benefits of remote controls are gained and leveraged without designing or providing a remote control specifically for a given appliance. This affords considerable cost savings.

These teachings are highly flexible in practice and will accommodate a wide variety of appliances. These teachings are also highly scalable and will accommodate essentially any number of appliances, protocols, control instructions, and so forth.

Figure 1:
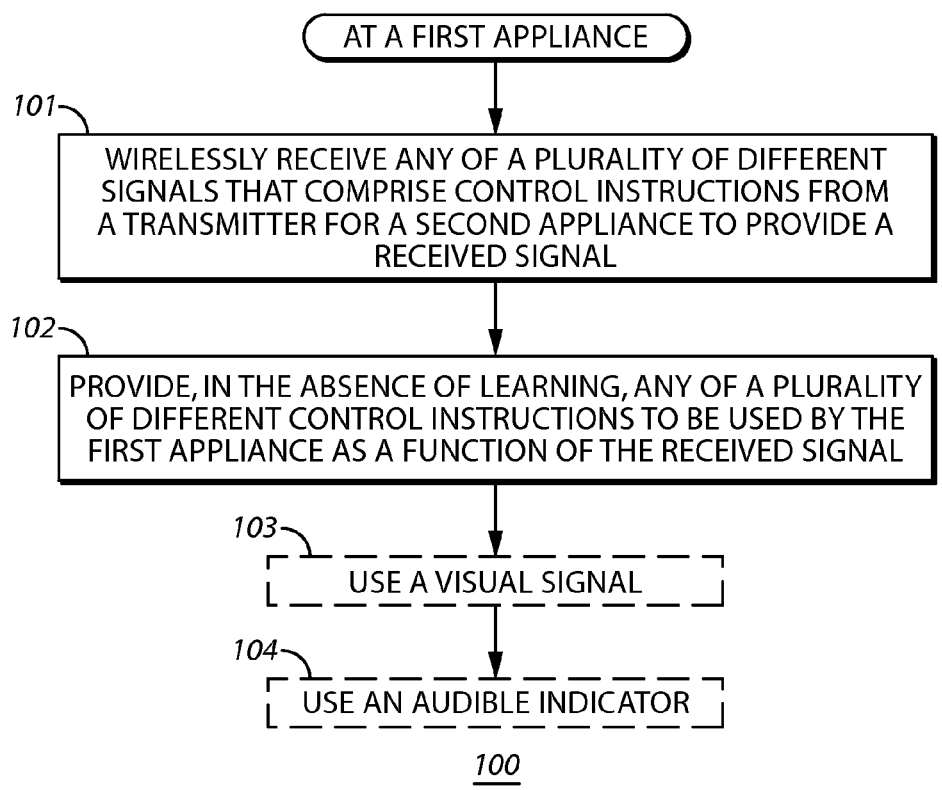
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented.

Generally speaking, a first appliance carries out this process 100. This first appliance can comprise any of a variety of apparatuses including, but not limited to, utilities, featured devices, and sensors, to note but a few.

Utilities are apparatuses that, once installed, comprise a part of the building's infrastructure (often hidden from view, such as behind walls or doors or in garages or basements) and typically lack much in the way of a visual design aesthetic; these components serve a utilitarian function and their appearance supports that role. Examples in these regards include, but are not limited to, installed pumps (such as a water pump in a well, a sump pump, or a sewage pump, to note but a few examples in these regards), a central furnace (including heat pumps), a central air conditioner, a central humidity controller, a movable barrier operator (such as a garage door opener, a driveway gate opener, and so forth), a water softener, a garbage disposal, or an installed electricity generator (such as a gas or natural gas generator, a wind-powered generator, a solar-powered electricity source, and so forth).

Featured devices may, or may not, be installed as well but otherwise tend to offer a design aesthetic that goes beyond mere utility. Examples of this kind of appliance include installed kitchen appliances (other than a garbage disposal which tends towards a utilitarian look and is usually installed out of sight) and laundry appliances. More specific examples include, but are not limited to, clothes washers, clothes dryers, stoves, ovens, indoor grills, installed exhaust fans, automatic dishwashers, refrigerators, freezers, microwave ovens, trash compactors, and so forth.

Sensors, in turn, are appliances that serve, as a primary or sole function, to detect one or more conditions. Examples include, but are not limited to, smoke detectors, gas detectors, movement detectors (including, by way of example, passive-infrared-based detectors regardless whether they are standalone components or comprise an integral part of some other apparatus such as a light fixture), a living-presence detector (such as a human detector or animal detector), a water detector (to detect, for example, flooded conditions in a basement), an environmental-state detector (to detect, for example, internal or external temperature or humidity, frost conditions, rain or other precipitation, wind, and so forth), an access detector (such as, but not limited to, a door-state detector (to detect, for example, whether a door is open, closed, opening, closing, or somewhere in between)), a weight-based detector (to determine, for example, whether a visitor is standing outside the residence at the front door), or a window-state detector with other possibilities existing.

In many application settings this first appliance will belong to a class of appliances. For example, the class may comprise the class of movable barrier operators (in which case the first appliance can comprise a movable barrier operator such as a garage door opener, a swinging or sliding gate opener, a rolling shutter operator, a dropping fire door operator, and so forth). As another example in these regards, the class may comprise the class of electronically-controlled light fixtures in which case the first appliance can comprise an electronically-controlled light fixture. Numerous other possibilities of course exist in these regards and these two specific examples of a class of appliance are offered only as non-limiting illustrative examples.

This first appliance, whatever it may specifically be, will have a plurality of selectable and/or controllable functions. These functions can include operational-state settings (such as "on" or "off") as well as operational-parameter settings. For a movable barrier operator, an example of an operational-parameter setting might include increasing or decreasing a force threshold that serves to facilitate detecting when a moving barrier contacts an obstacle. For an electronically-controlled light fixture that includes a motion detector, an example of an operational-parameter setting might include increasing or decreasing a range sensitivity value that serves to control the fixture's motion-detection range. The first appliance may, or may not (as desired), have specific and dedicated user interfaces (such as buttons, switches, touchscreen displays, and so forth) that permit a user to select or to otherwise adjust such functionality.

Step 101 of this process 100 provides for wirelessly receiving any of a plurality of different signals that comprise control instructions from a transmitter for a second appliance other than the first appliance and where the second appliance comprises a different class of appliance than the first appliance to provide a received signal. This can comprise, for example, receiving these different signals via a radio-frequency carrier or via infrared-based reception with other possibilities being available as well. Wireless transmission and reception techniques and methodologies are well known in the art. Accordingly, further elaboration will not be provided here for the sake of brevity.

As noted, these different signals comprise control instructions from a transmitter for a second appliance that comprises a member of a different class of appliance as compared to the first appliance. By way of illustration and without intending any limitations in these regards, the first appliance might belong to the class of movable-barrier operator appliances or the class of electronically-controlled light fixture appliances while the second appliance belongs, for example, to the class of entertainment appliances (and hence might comprise, for example, an audio-playback apparatus (such as a compact disc or digital audio file playback apparatus) or an audio-visual-playback apparatus (such as a television receiver, digital video recorder, or digital video disc playback apparatus)).

Accordingly, the aforementioned control instructions as sourced by this second-appliance transmitter will comprise instructions that pertain to the specific functionality of the corresponding second appliance. For example, if the second appliance comprises a television receiver, these control instructions will likely include instructions regarding increasing, decreasing, or muting audio volume, incrementing or decrementing a present channel selection, and so forth.

Figure 2:
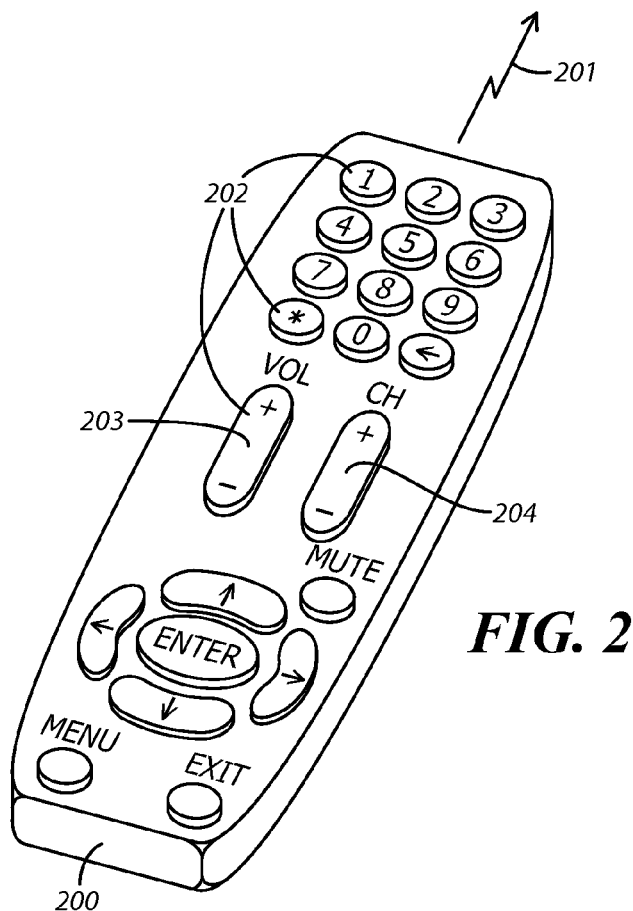
FIG. 2 comprises a perspective view as configured in accordance with various embodiments of the invention.

FIG. 2 provides an illustrative though non-limiting representation of a second-appliance transmitter 200 that can serve to source these different signals 201 that comprise the second-appliance instructions. Such a transmitter 200 will typical include a plurality of user-interface surfaces 202 (such as push buttons) that, when asserted by the user, cause the transmitter 200 to transmit a corresponding one of the control instructions. Many (or even all) of these user-interface surfaces 202 can have specific functionality tied thereto. For example, when the transmitter 200 is configured to remotely control a television receiver, these user-interface surfaces 202 can include a volume-control interface 203 and a channel-control interface 204. User selection of these surfaces 203 and 204, for example, will cause the transmitter 200 to transmit an instruction to increase or decrease an audible-volume level and to increase or decrease a selected channel of the corresponding television receiver, respectively.

As noted above, these transmissions are typically encoded in a particular manner that can be utterly, or at least partially, unique to the second appliance or to the appliance class that comprises the second appliance. This encoding can pertain to any of the modulation type, bit specifications (i.e., bit duration, amplitude, envelope characteristics, bit-transition requirements, and so forth), field content, specifications, and order, synchronization specifications, acknowledgement requirements, security provisions, and so forth.

This encoding can also pertain to substantive coding regarding, for example, the substantive meaning to be accorded to a particular bit or plurality of bits in a given field. As an illustrative example in these regards, the bit sequence "0110110" in a first field of a message may serve to identify an appliance manufacturer while that same bit sequence in a different field of that same message may serve to specify, for a particular manufacturer and appliance, that the audible volume of the appliance is to be incrementally increased.

By way of further elaboration in these regards, the aforementioned RC-5 protocol specifies using a Manchester-coded bitstream modulating a 36 kHz carrier (though some manufacturers utilize, instead, 38 kHz or 40 kHz carrier). A transmitted command comprises 14 bits. These 14 bits include a start bit (a logical "1" that permits the receiver to determine a proper gain), a field bit to denote whether the command sent is in a lower field (logic 1=0 to 63 decimal) or an upper field (logic 0=64 to 127 decimal), and a control bit that toggles with each button assertion (to allow the receiver to distinguish between two successive button presses (such as "1", "1" for "11"). The 14 bits also include a five-bit system address to specify one of 32 possible appliance categories and a 6-bit command. This 6-bit command, in conjunction with the aforementioned field bit, represents one of 128 possible RC-5 commands.

So configured, and at least in principle, RC-5 control instructions comprise generic control instructions in that control instructions for, say, a compact disc player can be received and acted upon by any RC-5-compliant compact disc player regardless of the manufacturer. An RC-5-compliant television receiver, of course, will know to ignore such control instructions as the television receiver will understand to ignore instructions generically intended for compact disc players. The more recently introduced RC-6 protocol extends the capabilities to RC-5 to accommodate up to 256 different classes of appliance and up to 256 generic commands per appliance class.

Referring still to FIG. 1, at step 102 the first appliance provides (for example, as part of its intrinsic programming or as a look-up table or similar resource) any of a plurality of different control instructions to be used by itself as a function of the aforementioned received signal. These different control instructions will typically each correspond to different control functions of the first appliance.

As one set of illustrative examples in these regards, when the first appliance comprises a movable barrier operator these different control instructions can comprise one or more of:

an instruction pertaining to movement of a movable barrier (such as starting, stopping, or reversing movement);

an instruction pertaining to adjustment of a movable barrier stop location (such as a stop location as pertains to a fully-opened position or a fully-closed position, or a stop location as pertains to a mid-way position to accommodate, for example, a so-called pet opening);

an instruction pertaining to adjustment regarding a detected-force threshold (where, for example, the movable barrier operator monitors a present force being employed to move the movable barrier in order to detect the possible presence of an obstacle in the barrier's path of movement and where the instruction pertains to automatically or non-automatically establishing or adjusting such a threshold);

an instruction pertaining to adjustment of a speed setting (such as a velocity (for example, a maximum permitted speed) or acceleration at which the movable barrier is moved or halted (for example, so-called soft starts and soft stops));

an instruction pertaining to adjusting a timer-to-close setting (when, for example, the movable barrier operator is configured to automatically close an opened movable barrier when a predetermined amount of time concludes after opening the barrier and the instruction relates to setting that duration of time or enabling or disabling this functionality);

an instruction pertaining to adjusting a photobeam setting (when photobeams are used, for example, to detect an obstacle in the path of the movable barrier or when photobeams are used to detect when to enable or disable worklights or alarms);

an instruction pertaining to a passive infrared-based detection setting (when passive infrared detection serves to detect, for example, the presence of a person within a given detection zone);

an instruction pertaining to a time-of-day setting (such as the time of day or other time-based functionality such as automatically opening or closing at a specific time of day);

an instruction pertaining to a radio-control setting (such as clearing, enabling, or disabling existing radio codes, learning new radio codes as pertain to movement of the movable barrier, illuminating a worklight, and so forth, or correlating a radio code to a specific operating profile);

an instruction pertaining to a radio-network setting (such as clearing, learning, enabling, or disabling a paired bidirectional radio network code); and/or an instruction pertaining to an Internet-based control setting (such as setting an Internet Protocol identifier or selecting a service set identifier (SSID) or related password).

These selectable adjustments may be immediately available without having to enable the movable barrier operator to accept the instructions. In another approach, the movable barrier operator may require an enabling operation at the movable barrier operator in order for the operator to accept the instructions.

As another set of illustrative examples in these regards, when the first appliance comprises an electronically-controlled light fixture these different control instructions can comprise one or more of:

an instruction pertaining to adjustment of light intensity of the light fixture;

an instruction pertaining to adjustment of a rate of change of the light intensity of the light fixture (to control, for example, at rate by which the light intensity increases or decreases when shifting from one steady-state light intensity to another);

an instruction pertaining to adjustment of a color of light emanating from the light fixture (where color can usually be controlled by utilizing multiple light emitters with different color temperatures in conjunction with pulse-width modulation to create different percentages of each one of the multiple emitters);

an instruction pertaining to adjustment of at least one ambient-light threshold (when, for example, the electronically-controlled light fixture automatically switches from one lighting state to another as a function of an ambient-light level);

an instruction pertaining to adjustment of at least one motion-detection threshold (when, for example, the electronically-controlled light fixture automatically switches from one lighting state to another as a function of local movement);

an instruction pertaining to adjustment of at least one operation period (such as a period of time that a light remains illuminated upon detecting local movement or dusk, or a period of time that the first appliance remains in an adjustment state);

an instruction pertaining to adjustment of at least one operational state;

an instruction pertaining to adjustment of directionality of a motion sensor (for example, by widening or narrowing a motion sensor's field of view);

an instruction pertaining to adjustment of directionality of a light source;

an instruction pertaining to adjustment of directionality of the light fixture;

an instruction pertaining to adjustment regarding which of a plurality of light-emitting devices are simultaneously illuminated; and/or an instruction pertaining to adjustment of an output intensity of at least one of a plurality of light-emitting devices.

Similar to the foregoing, these selectable adjustments may be immediately available without having to enable the electronically-controlled light fixture to accept the instructions. In another approach, the electronically-controlled light fixture may require an enabling operation at the electronically-controlled light fixture in order for the light fixture to accept the instructions.

As noted, the control instructions that the first appliance receives from the aforementioned transmitter do not, in fact, constitute control instructions that literally have such meanings. Accordingly, by one approach, this step 102 can comprise translating at least some of the wirelessly-transmitted control instructions as correspond to the second appliance into control instructions that correspond to the first appliance. This can comprise, by one approach, translating generic control instructions for a class of appliances that includes the second appliance into control instructions that are relevant to and usable by the first appliance.

For example, the second appliance could be a television receiver and the transmitter could transmit an RC-6-compliant message that identifies in one dedicated field the message's instruction as being for a television receiver and that further sets forth in another dedicated field a generic instruction to "mute" audio playback by the television receiver. The first-appliance apparatus as described herein, upon receiving such a message, could identify an appropriate translation look-up table based upon that "television receiver" indicator and could then use that translation look-up table to correlate the "mute" instruction with, for example, a "disable PIR motion detector" instruction. The first-appliance apparatus could then act upon that "disable PIR motion detector" instruction by, in fact, disabling its PIR motion detector.

Figure 3:
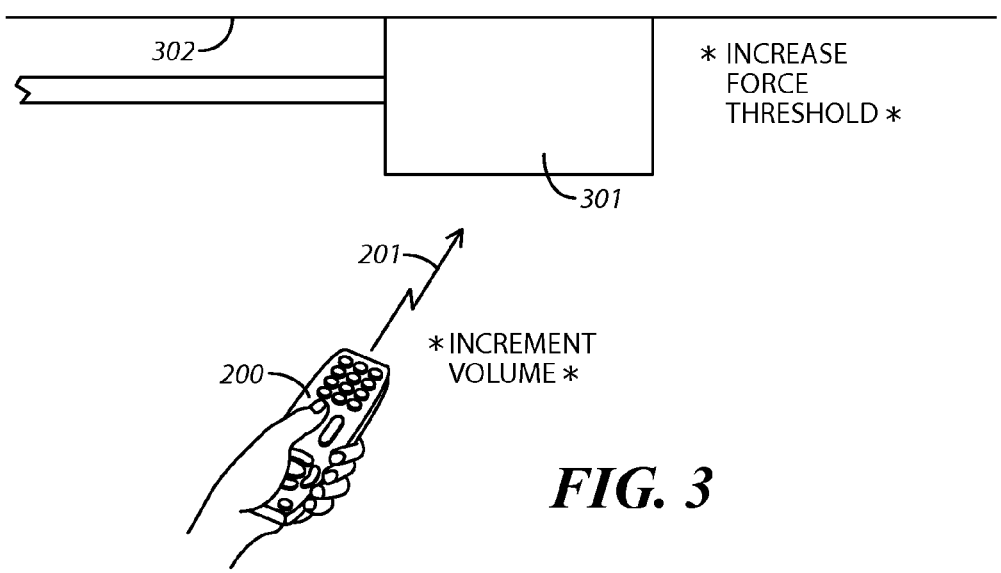
FIG. 3 comprises a side-elevational view as configured in accordance with various embodiments of the invention.

FIG. 3 provides one illustrative example in these regards. In this example, the transmitter 200 for the second appliance transmits a signal 201 that comprises a generic control instruction for a television receiver to increment the volume setting of the television receiver. In this example, the first appliance comprises a movable barrier operator 301. This movable barrier operator 301, in turn, translates this "increment volume" control instruction into a corresponding "increase force threshold" control instruction that is meaningful to and usable by the movable barrier operator 301. So configured, a user can utilize a television receiver remote control to adjust the force threshold settings of their garage door opener notwithstanding that the latter is attached to the ceiling 302 of their garage and might otherwise only be accessible by use of a ladder.

Figure 4:
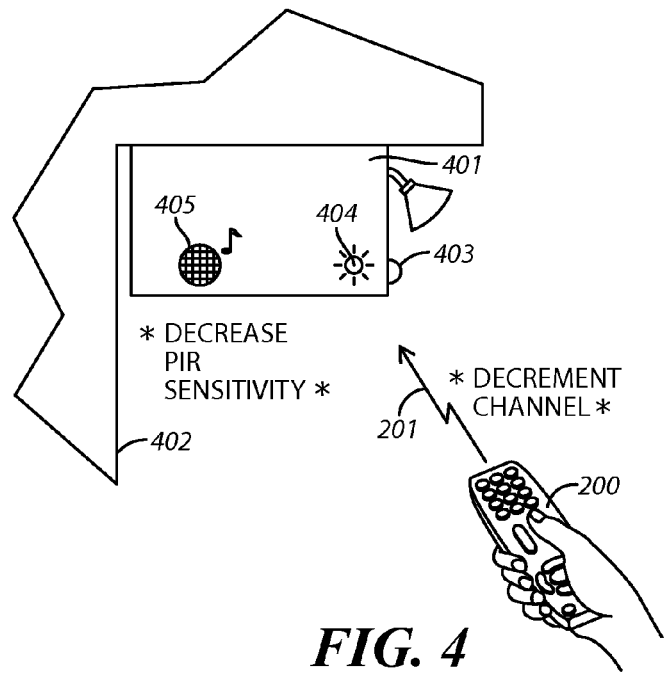
FIG. 4 comprises a side-elevational view as configured in accordance with various embodiments of the invention.

FIG. 4 provides another illustrative example in these regards. In this example, the transmitter 200 for the second appliance transmits a signal 201 that comprises a generic control instruction for a television receiver to decrement a presently-selected channel setting of the television receiver. In this example, the first appliance comprises an electronically-controlled light fixture 401 that is attached high on the side 402 of a house. This electronically-controlled light fixture 401, in turn, translates this "decrement channel" control instruction into a corresponding "decrease PIR sensitivity" control instruction that is meaningful to and usable by the electronically-controlled light fixture 401. So configured, the user can utilize their television receiver remote control to adjust the sensitivity of a passive-infrared (PIR) detector 403 to thereby adjust a detection range for the electronically-controlled light fixture 401 notwithstanding that this appliance is mounted sufficiently high that a ladder would otherwise be necessary to facilitate such an adjustment.

By one approach, this step 102 can comprise decoding the wirelessly-transmitted control instructions as pertain to the second appliance and then accessing a memory that stores one or more look-up tables and utilizing that look-up table to determine a corresponding control instruction for the first appliance. Using this approach a variety of control instructions for the first appliance can be correlated to a plurality of different control instructions for the second appliance.

With continued reference to both FIG. 1 and FIG. 4, this process 100 will also accommodate the optional step 103 of using a visual indicator 404 and/or the optional step 104 of using an audible indicator 405. These indicators 404 and 405 can serve to provide feedback to the user regarding reception and usability or use of the transmitter's emanations 201. For example, either or both indicators 404 and 405 can indicate when the first appliance is able to successfully utilize the wirelessly-transmitted control signal and/or when the first appliance is unable to successfully utilize the wirelessly-transmitted control instruction (as when, for example, the first appliance is unable to successfully decode the wirelessly-transmitted control signal or is otherwise unable to correlate the wirelessly-transmitted control signal with a control signal that pertains to the first appliance). Such indictors 404 and 405 can also serve, if desired, to provide information to the user regarding a particular functionality of the first appliance to which a present control instruction pertains.

Figure 5:
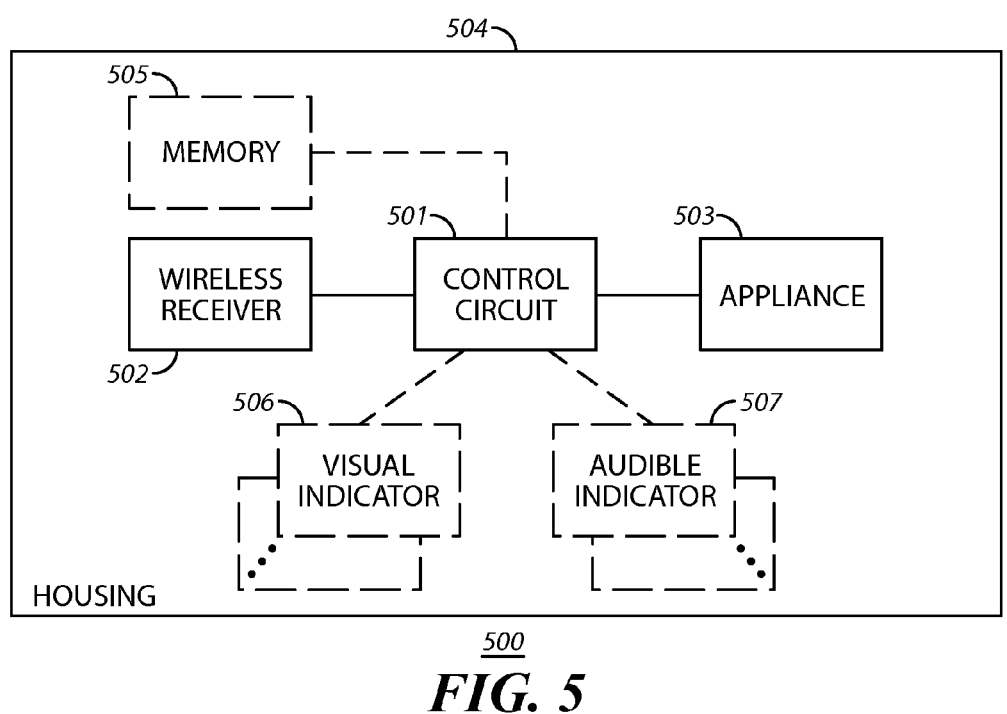
FIG. 5 comprises a block diagram as configured in accordance with various embodiments of the invention.

The above-described processes are readily enabled using any of a wide variety of available and/or readily configured platforms. Referring now to FIG. 5, an illustrative approach to such a platform 500 will now be provided.

In this illustrative example the platform 500 includes a control circuit 501 that operably couples to a wireless receiver 502 and a corresponding appliance 503 (i.e., the aforementioned first appliance). Such a control circuit 501 can comprise a fixed-purpose hard-wired platform or can comprise a partially or wholly programmable platform. All of these architectural options are well known and understood in the art and require no further description here. A housing 504 serves to integrate the various components as comprise this platform 500 by containing or otherwise supporting such components.

When the control circuit 501 comprises a partially or wholly-programmable platform, the control circuit 501 can further operably couple to a memory 505. This memory 505, in turn, can serve, at least in part, to store instructions that, when executed by the control circuit 501, cause the latter to carry out one or more of the steps, actions, and/or functions described herein. This memory 505 can also serve, if desired, to store one or more of the aforementioned look-up tables.

As noted above, these teachings will accommodate the use of visual and or audible indicators. Accordingly, if desired, such a platform 500 can also comprise one or more visual indicators 506 that operably couple to the control circuit 501 and/or one or more audible indicators 507 that operably couple to the control circuit 501.

Such an apparatus may be comprised of a plurality of physically distinct elements as is suggested by the illustration shown in FIG. 5. It is also possible, however, to view this illustration as comprising a logical view, in which case one or more of these elements can be enabled and realized via a shared platform.

So configured, a given appliance will permit a user to select, adjust, and/or otherwise influence various aspects of the appliance's functionality and operability via a remote control notwithstanding that the remote control is not designed or specifically intended for use with that appliance. This approach avoids the expense and complexity of providing a dedicated remote control with the appliance and permits a user to leverage any (or most) existing remote controls that they might already (likely) have. This approach also avoids providing the user with yet another remote control that they may misplace, lose, or mis-associate with another appliance.

By one approach, the first appliance carries out the described process 100 without requiring a so-called learning state or exercise. As used herein, learning will be understood to refer to a dedicated state during which the device is specifically rendered open to changes with respect to its usual operating behaviors and/or requirements. This can include, for example, changes to operating parameters or changes to operational requirements that dictate when and/or how the device responds to certain stimuli during its ordinary mode of operation.

Accordingly, and by way of example, these teachings permit a user to simply take an already-available remote control for, say, their television and use that remote control to adjust the behavior of the first appliance notwithstanding that the first appliance may be functionally far-afield from a television. Though such an activity will likely benefit from conveying some instructional content to the user (such as "Use the volume control to adjust the range of the light fixture's PIR") the user is not burdened with needing to somehow pair the remote control with the appliance or to otherwise have either device learn something about the other prior to making effective use of the remote control in these regards.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. An apparatus comprising:
    a housing;
    a first appliance disposed at least in part within the housing;
    a wireless receiver disposed at least in part within the housing;
    a control circuit disposed at least in part within the housing and being operably coupled to the first appliance and to the wireless receiver,
    the control circuit being configured to provide to the first appliance, without requiring a learning state during which the control circuit is rendered open to changes with respect to usual operating behaviors, any of a plurality of different control instructions as a function of signals received via the wireless receiver,
    wherein the signals comprise wirelessly-transmitted control instructions from a transmitter for a second appliance,
    wherein the signals are for a different class of appliance than the first appliance,
    wherein the control circuit is configured to decoding certain wirelessly-transmitted control instructions for the second appliance into corresponding control instructions for the first appliance by correlating the certain wirelessly-transmitted control signals for the second appliance.

2. The apparatus of claim 1 wherein at least two of the wirelessly-transmitted control instructions produced by the transmitter are produced by activation of different buttons.

3. The apparatus of claim 1 wherein at least two of the plurality of different control instructions each corresponds to a different control function.

4. The apparatus of claim 1 wherein the first appliance belongs to a class of appliances for movable barrier operators.

5. The apparatus of claim 1 wherein the first appliance belongs to a class of appliances for electronically-controlled light fixtures.

6. The apparatus of claim 1 wherein the first appliance comprises a movable barrier operator.

7. The apparatus of claim 6 wherein the plurality of different control instructions comprise at least one of:

an instruction pertaining to movement of a movable barrier;
an instruction pertaining to adjustment of a movable barrier stop location;
an instruction pertaining to adjustment regarding a detected-force threshold;
an instruction pertaining to adjustment of a speed setting;
an instruction pertaining to adjusting a timer-to-close setting;
an instruction pertaining to adjusting a photobeam setting;
an instruction pertaining to a passive infrared-based detection setting;
an instruction pertaining to a time-of-day setting;
an instruction pertaining to a radio control setting;
an instruction pertaining to a radio network setting;
an instruction pertaining to an Internet-based control setting.

8. The apparatus of claim 6 wherein the second appliance comprises an entertainment appliance.

9. The apparatus of claim 8 wherein the entertainment appliance comprises at least one of:
    an audio-playback apparatus;
    an audio-visual-playback apparatus.

10. The apparatus of claim 1 wherein the first appliance comprises an electronically-controlled light fixture.

11. The apparatus of claim 10 wherein the plurality of different control instructions comprise at least one of:
    an instruction pertaining to adjustment of light intensity of the light fixture;
    an instruction pertaining to adjustment of a rate of change of the light intensity of the light fixture;
    an instruction pertaining to adjustment of a color of light emanating from the light fixture;
    an instruction pertaining to adjustment of at least one ambient-light threshold;
    an instruction pertaining to adjustment of at least one motion-detection threshold;
    an instruction pertaining to adjustment of at least one operation period;
    an instruction pertaining to adjustment of at least one operational state;
    an instruction pertaining to adjustment of directionality of a motion sensor;
    an instruction pertaining to adjustment of directionality of a light source;
    an instruction pertaining to adjustment of directionality of the light fixture;
    an instruction pertaining to adjustment regarding which of a plurality of light emitting devices are simultaneously illuminated;
    an instruction pertaining to adjustment of an output intensity of at least one of a plurality of light emitting devices.

12. The apparatus of claim 10 wherein the second appliance comprises an entertainment appliance.

13. The apparatus of claim 12 wherein the entertainment appliance comprises at least one of:
    an audio-playback apparatus;
    an audio-visual-playback apparatus.

14. The apparatus of claim 1 wherein the wireless receiver comprises an infrared-signal receiver.

15. The apparatus of claim 1 wherein the certain wirelessly-transmitted control instructions comprise, at least in part, generic control instructions.

16. The apparatus of claim 15 wherein at least one of the generic control instructions comprises an instruction to increase an audible-volume level.

17. The apparatus of claim 15 wherein at least one of the generic control instructions comprises an instruction to increase or decrease a selected channel.

18. The apparatus of claim 1 further comprising: a memory operably coupled to the control circuit and serving to store at least one look-up table, wherein the control circuit is configured to utilize the at least one look-up table when decoding the certain wirelessly-transmitted control instructions for the second appliance.

19. The apparatus of claim 1 further comprising:
at least one visual indicator that is operably coupled to the control circuit, wherein the control circuit is further configured to use the visual indicator to signal when the control circuit is able to successfully utilize the wirelessly-transmitted control instructions for the second appliance to provide control instructions to the first appliance.

20. The apparatus of claim 1 further comprising:
at least one visual indicator that is operably coupled to the control circuit, wherein the control circuit is further configured to use the visual indicator to signal when the control circuit is unable to successfully utilize the wirelessly-transmitted control instructions for the second appliance to provide control instructions to the first appliance.

21. The apparatus of claim 1 further comprising:
at least one audible indicator that is operably coupled to the control circuit, wherein the control circuit is further configured to use the audible indicator to signal when the control circuit is able to successfully utilize the wirelessly-transmitted control instructions for the second appliance to provide control instructions to the first appliance.

22. The apparatus of claim 1 further comprising:
at least one audible indicator that is operably coupled to the control circuit, wherein the control circuit is further configured to use the audible indicator to signal when the control circuit is unable to successfully utilize the wirelessly-transmitted control instructions for the second appliance to provide control instructions to the first appliance.

23. The apparatus of claim 1 further comprising:
at least one visual indicator that is operably coupled to the control circuit, wherein the control circuit is further configured to use the visual indicator to provide information regarding a particular functionality of the first appliance to which a present control instruction pertains.

24. A method comprising:
at a first appliance:
wirelessly receiving any of a plurality of different signals that comprise control instructions from a transmitter for a second appliance other than the first appliance and where the plurality of different signals relate to functionality of a different class of appliance than the first appliance to provide a received signal;
providing, without requiring a learning state during which the control circuit is rendered open to changes with respect to usual operating behaviors, any of a plurality of different control instructions to be used by the first appliance as a function of the received signal;
wherein the providing any of the plurality of different control instructions comprises providing any of the plurality of different control instructions to be used by the first appliance as a function of the received signal by decoding certain wirelessly-transmitted control instructions for a second appliance into corresponding control instructions for the first appliance by correlating the certain wirelessly-transmitted control signals for the second appliance.

25. The method of claim 24 wherein at least two of the plurality of different control instructions each corresponds to a different control function of the first appliance.

26. The method of claim 24 wherein the first appliance belongs to a class of appliances for movable barrier operators.

27. The method of claim 24 wherein the first appliance comprises a movable barrier operator.

28. The method of claim 27 wherein the plurality of different control instructions comprise at least one of:
an instruction pertaining to movement of a movable barrier;
an instruction pertaining to adjustment of a movable barrier stop location;
an instruction pertaining to adjustment regarding a detected-force threshold;
an instruction pertaining to adjustment of a speed setting;
an instruction pertaining to adjusting a timer-to-close setting;
an instruction pertaining to adjusting a photobeam setting;
an instruction pertaining to a passive infrared-based detection setting;
an instruction pertaining to a time-of-day setting;
an instruction pertaining to a radio control setting;
an instruction pertaining to a radio network setting;
an instruction pertaining to an Internet-based control setting.

29. The method of claim 27 wherein the second appliance comprises an entertainment appliance.

30. The method of claim 29 wherein the entertainment appliance comprises at least one of:
an audio-playback apparatus;
an audio-visual-playback apparatus.

31. The method of claim 24 wherein the first appliance belongs to a class of appliances for electronically-controlled light fixtures.

32. The method of claim 24 wherein the first appliance comprises an electronically-controlled light fixture.

33. The method of claim 32 wherein the plurality of different control instructions comprise at least one of:
an instruction pertaining to adjustment of light intensity of the light fixture;
an instruction pertaining to adjustment of a rate of change of the light intensity of the light fixture;
an instruction pertaining to adjustment of a color of light emanating from the light fixture;
an instruction pertaining to adjustment of at least one ambient-light threshold;
an instruction pertaining to adjustment of at least one motion-detection threshold;
an instruction pertaining to adjustment of at least one operation period;
an instruction pertaining to adjustment of at least one operational state;
an instruction pertaining to adjustment of directionality of a motion sensor;
an instruction pertaining to adjustment of directionality of a light source;
an instruction pertaining to adjustment of directionality of the light fixture;
an instruction pertaining to adjustment regarding which of a plurality of light-emitting devices are simultaneously illuminated;
an instruction pertaining to adjustment of an output intensity of at least one of a plurality of light-emitting devices.

34. The method of claim 32 wherein the second appliance comprises an entertainment appliance.

35. The method of claim 34 wherein the entertainment appliance comprises at least one of:
an audio-playback apparatus;
an audio-visual-playback apparatus.

36. The method of claim 24 wherein wirelessly receiving any of a plurality of different signals comprises wireless receiving the signals using infrared-based reception.

37. The method of claim 24 wherein the certain wirelessly-transmitted control instructions comprise, at least in part, generic control instructions.

38. The method of claim 37 wherein at least one of the generic control instructions comprises an instruction to increase an audible-volume level.

39. The method of claim 37 wherein at least one of the generic control instructions comprises an instruction to increase or decrease a selected channel.

40. The method of claim 24 wherein decoding, at least in part, the certain wirelessly-transmitted control instructions for the second appliance comprises accessing a memory that stores at least one look-up table and utilizing the at least one look-up table when decoding the certain wirelessly-transmitted control instructions for the second appliance.

41. The method of claim 24 further comprising:
using a visual indicator to signal when the first appliance is able to successfully utilize the wirelessly-transmitted control instructions for the second appliance to provide the control instructions to be used by the first appliance.

42. The method of claim 24 further comprising:
using a visual indicator to signal when the first appliance is unable to successfully utilize the wirelessly-transmitted control instructions for the second appliance to provide control instructions to be used by the first appliance.

43. The method of claim 24 further comprising:
using an audible indicator to signal when the first appliance is able to successfully utilize the wirelessly-transmitted control instructions for the second appliance to provide control instructions to be used by the first appliance.

44. The method of claim 24 further comprising:
using an audible indicator to signal when the first appliance is unable to successfully utilize the wirelessly-transmitted control instructions for the second appliance to provide control instructions to be used by the first appliance.

45. The method of claim 24 further comprising:
using a visual indicator to provide information regarding a particular functionality of the first appliance to which a present control instruction pertains.

* * * * *